(12) United States Patent
Ackley (10) Patent No.: US 8,220,619 B2
(45) Date of Patent: Jul. 17, 2012

(54) METHOD AND APPARATUS FOR TRANSPORTING PELLET-SHAPED ARTICLES

(75) Inventor: E. Michael Ackley, Mannington, NJ (US)

(73) Assignee: Ackley Machine Corporation, Moorestown, NJ (US)

( * ) Notice: Subject to any disclaimer, the term of this patent is extended or adjusted under 35 U.S.C. 154(b) by 150 days.

(21) Appl. No.: 12/662,945

(22) Filed: May 12, 2010

(65) Prior Publication Data

US 2011/0089001 A1    Apr. 21, 2011

Related U.S. Application Data

(63) Continuation-in-part of application No. 29/347,189, filed on Oct. 20, 2009.

(51) Int. Cl.
*B65G 47/00* (2006.01)
*B41F 17/36* (2006.01)

(52) U.S. Cl. .............. 198/803.13; 198/803.14; 198/850; 198/483.1

(58) Field of Classification Search .............. 198/867.1, 198/867.11, 867.12, 803.1, 803.13, 803.14, 198/803.15, 850–853, 483.1, 484.1
See application file for complete search history.

(56) References Cited

U.S. PATENT DOCUMENTS

| | | | |
|---|---|---|---|
| 3,655,110 A | 4/1972 | Eisenbach | |
| 3,884,143 A | 5/1975 | Ackley | |
| 4,308,942 A * | 1/1982 | Ackley | 198/380 |
| 4,632,028 A | 12/1986 | Ackley | |
| 4,672,892 A * | 6/1987 | Ackley | 101/35 |
| 5,360,499 A | 11/1994 | Savovic et al. | |
| 5,630,499 A | 5/1997 | Louden et al. | |
| 5,836,243 A | 11/1998 | Ackley | |
| 5,996,768 A * | 12/1999 | Boyce et al. | 198/397.01 |
| 6,085,627 A * | 7/2000 | Denney | 83/874 |
| D432,341 S | 10/2000 | Shimbo et al. | |
| 6,314,876 B1 | 11/2001 | Ackley | |
| 6,360,866 B1 | 3/2002 | Chiba et al. | |
| 6,409,030 B1 | 6/2002 | Schlemper | |
| D463,977 S | 10/2002 | Castellanos et al. | |
| 6,651,842 B2 * | 11/2003 | Collins et al. | 221/253 |
| D482,963 S | 12/2003 | Vincent et al. | |
| 6,834,581 B2 | 12/2004 | Ackley | |
| 7,102,741 B2 | 9/2006 | Ackley, Jr. et al. | |
| 7,114,445 B2 | 10/2006 | Ackley, Jr. et al. | |
| D543,103 S | 5/2007 | Roche et al. | |
| D545,096 S | 6/2007 | Simpson et al. | |
| 7,456,946 B2 | 11/2008 | Ackley, Jr. et al. | |
| 2008/0028955 A1 | 2/2008 | Bauer et al. | |
| 2008/0047803 A1 | 2/2008 | Ackley, Jr. | |

OTHER PUBLICATIONS

Ackley, Jr., U.S. Appl. No. 29/311,505, filed Apr. 3, 2009.

* cited by examiner

*Primary Examiner* — Mark A Deuble
(74) *Attorney, Agent, or Firm* — Nixon & Vanderhye P.C.

(57) ABSTRACT

A conveyer apparatus for transporting and processing pellet-shaped articles includes a conveyer and a discharge device. The conveyer includes a plurality of carrier bars to convey a plurality of articles along a predetermined conveyer path. Each carrier bar has a pocket half that cooperates with a pocket half of an adjacent carrier bar to form an article receiving pocket to receive and transport an article along the predetermined conveyer path. The discharge device is positioned with respect to the carrier bars to dislodge articles from the carrier bars.

20 Claims, 13 Drawing Sheets

METHOD AND APPARATUS FOR TRANSPORTING PELLET-SHAPED ARTICLES

CROSS-REFERENCE TO APPLICATION

This application is a continuation-in-part of U.S. Design Application No. 29/347,189, filed Oct. 20, 2009, which is incorporated herein by reference in its entirety.

FIELD OF THE INVENTION

The present invention relates to methods and apparatuses for transporting pellet-shaped articles, e.g., tablets.

BACKGROUND OF THE INVENTION

Processing of pellet-shaped articles (e.g., tablets), such as marking the articles with indicia, coloring the articles, laser drilling holes in the articles, and/or coating the articles, is known in the art. The articles may be transported past one or more processing stations (e.g., printing, inspection, drilling, etc.) by carrier bars provided with one or more article receiving pockets.

In a typical application, the carrier bars are transported along a conveyer including a portion that transitions from a generally horizontal portion to a generally vertical portion to allow removal of the articles from the pockets, i.e., removal aided by gravity. In some instances, one or more articles stick or adhere to their respective pocket (e.g., coating or marking on the article at least partially adheres to the pocket), which prevents the article from falling out of the pocket as the carrier bar travels along the generally vertical portion of the conveyer. Accordingly, one or more articles may not be properly discharged into the proper chute or outlet for further processing (e.g., distribution).

Thus, there is a need in the art for an improved method and apparatus for transporting articles that do not suffer from the above-mentioned drawbacks.

SUMMARY OF THE INVENTION

One aspect of the invention relates to a conveyer apparatus for transporting and processing pellet-shaped articles. The conveyer apparatus includes a conveyer and a discharge device. The conveyer includes a plurality of carrier bars to convey a plurality of articles along a predetermined conveyer path. Each carrier bar has a pocket half that cooperates with a pocket half of an adjacent carrier bar to form an article receiving pocket to receive and transport an article along the predetermined conveyer path. The discharge device is positioned with respect to the carrier bars to dislodge articles from the carrier bars.

Another aspect of the invention relates to a method for transporting and processing pellet-shaped articles. The method includes conveying a plurality of articles along a predetermined conveyer path within carrier bars each having a pocket half that cooperates with a pocket half of an adjacent carrier bar to form an article receiving pocket to receive and transport an article along the conveyer path, and dislodging any articles that are stuck to one of the pocket halves.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

The following description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

Figure 1:
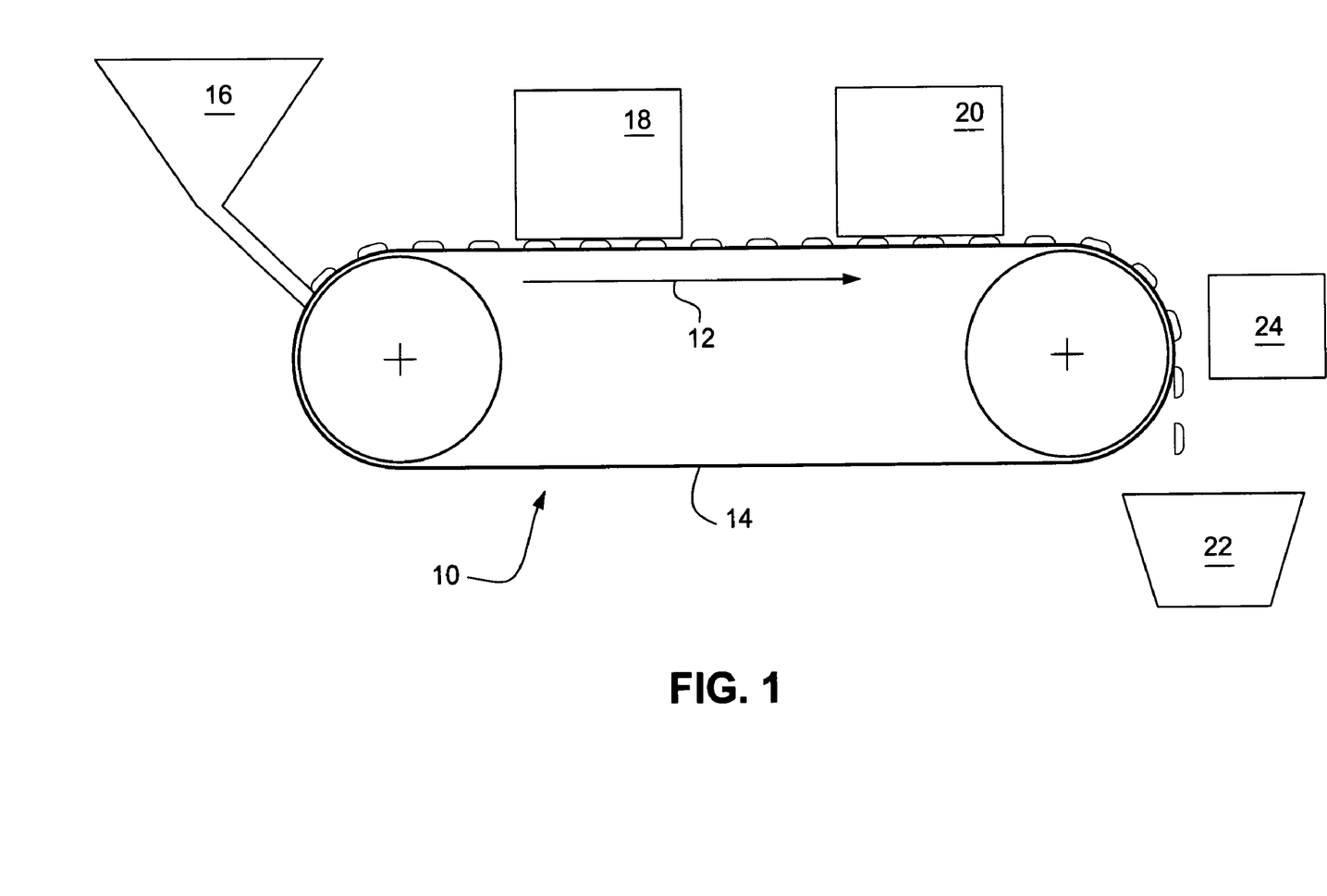
FIG. 1 is a schematic view of a conveyer apparatus for conveying a plurality of pellet-shaped articles according to an embodiment of the present invention.

FIG. 1 illustrates a conveyer apparatus 10 including a plurality of carrier bars structured to transport or convey a plurality of pellet-shaped articles along a predetermined conveyer path 12. In the illustrated embodiment, the pellet-shaped articles are in the form of tablets as described below. However, it should be appreciated that the carrier bars may be adapted for use with other pellet-shaped articles, e.g., caplets, capsules, pills, etc.

As described in greater detail below, each carrier bar cooperates with an adjacent carrier bar to receive and seat the tablets within a pocket defined by the adjacent carrier bars. In addition, the apparatus provides a discharge device structured to facilitate dislodgement of the tablets from respective pockets. That is, one or more tablets may at least partially stick or adhere to the carrier bars and the discharge device ensures that such "stuck" tablets are properly discharged into the proper chute or outlet for further processing.

Figure 2A:
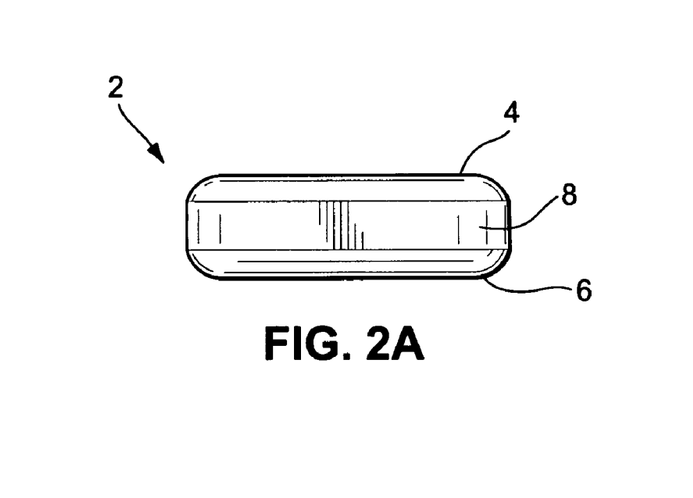
FIG. 2A is a side view of a tablet.
Figure 2B:
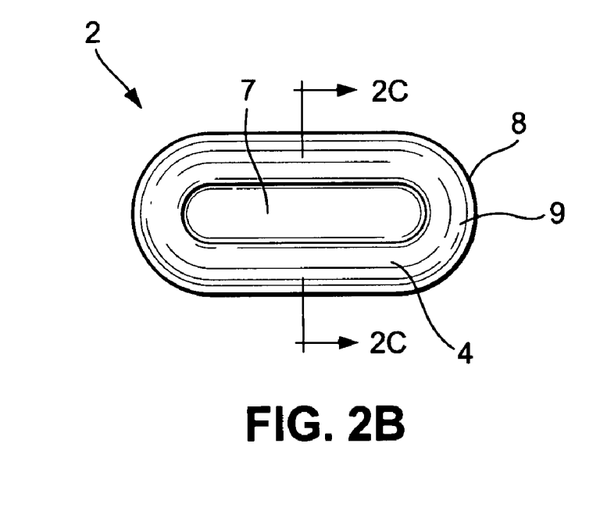
FIG. 2B is a top view of a tablet.
Figure 2C:
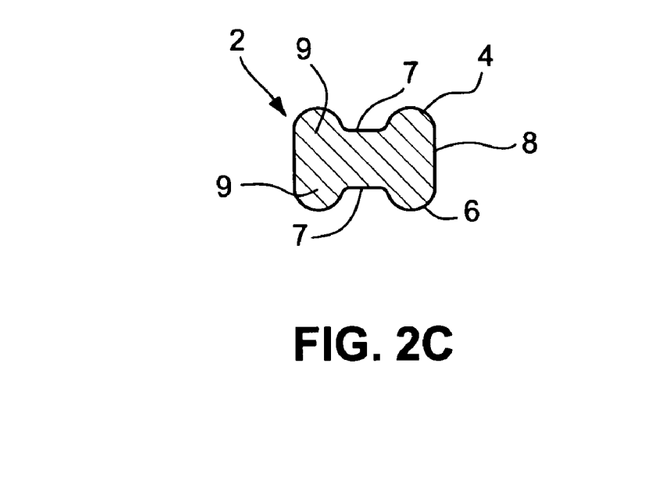
FIG. 2C is a cross-sectional view through line 2C-2C of FIG. 2B.
Figures 3, 4:
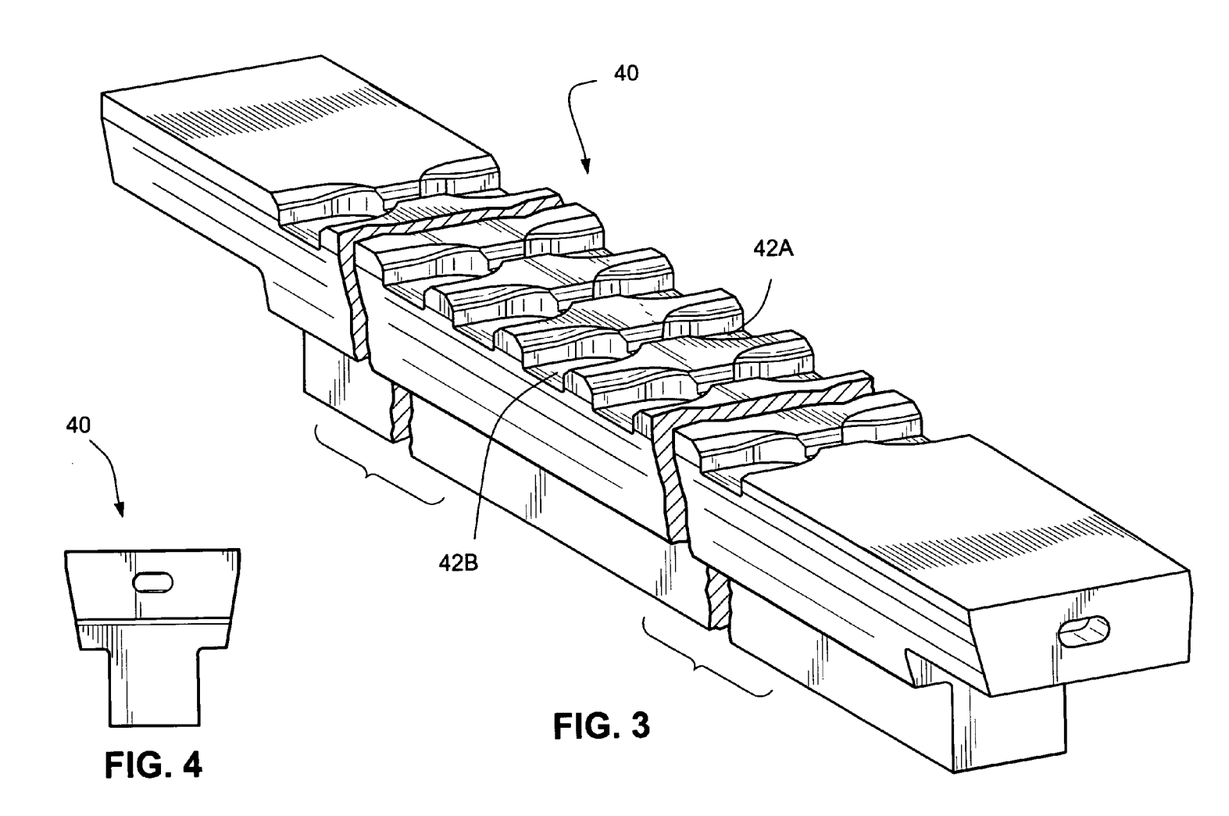
FIG. 3 is a perspective view of a carrier bar according to an embodiment of the present invention.
FIG. 4 is a side view of the carrier bar of FIG. 3.
Figure 5:
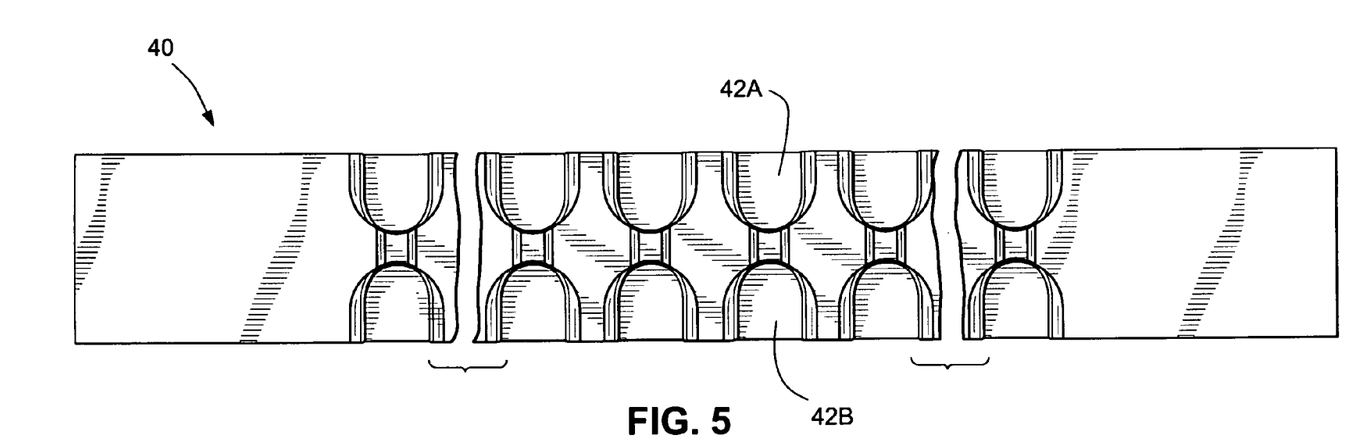
FIG. 5 is a top view of the carrier bar of FIG. 3.
Figure 6:
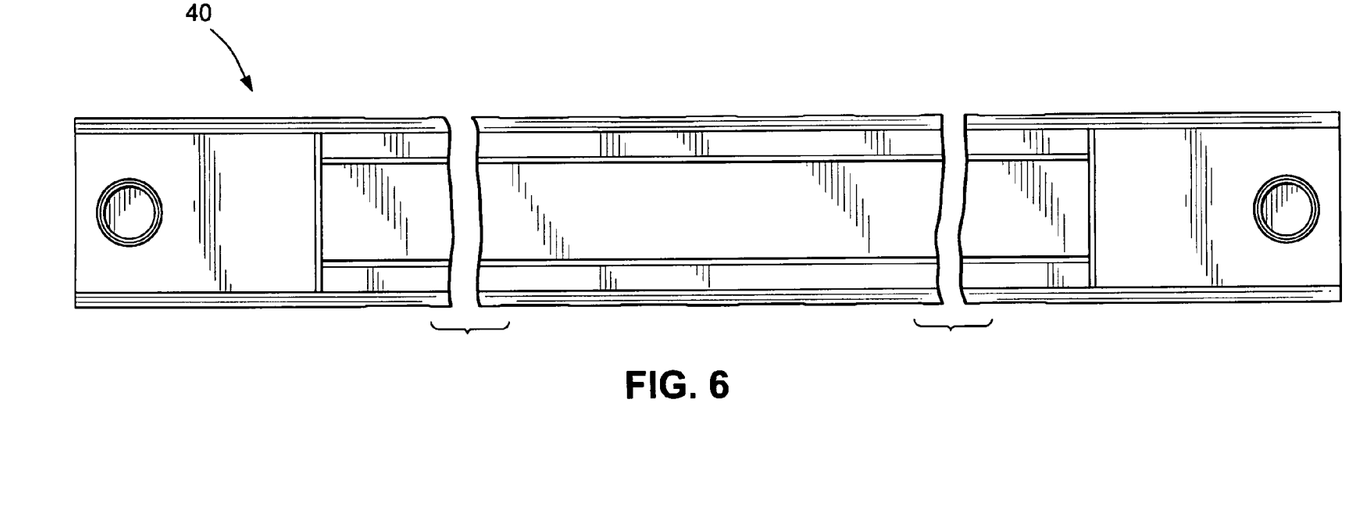
FIG. 6 is a bottom view of the carrier bar of FIG. 3.
Figure 7:
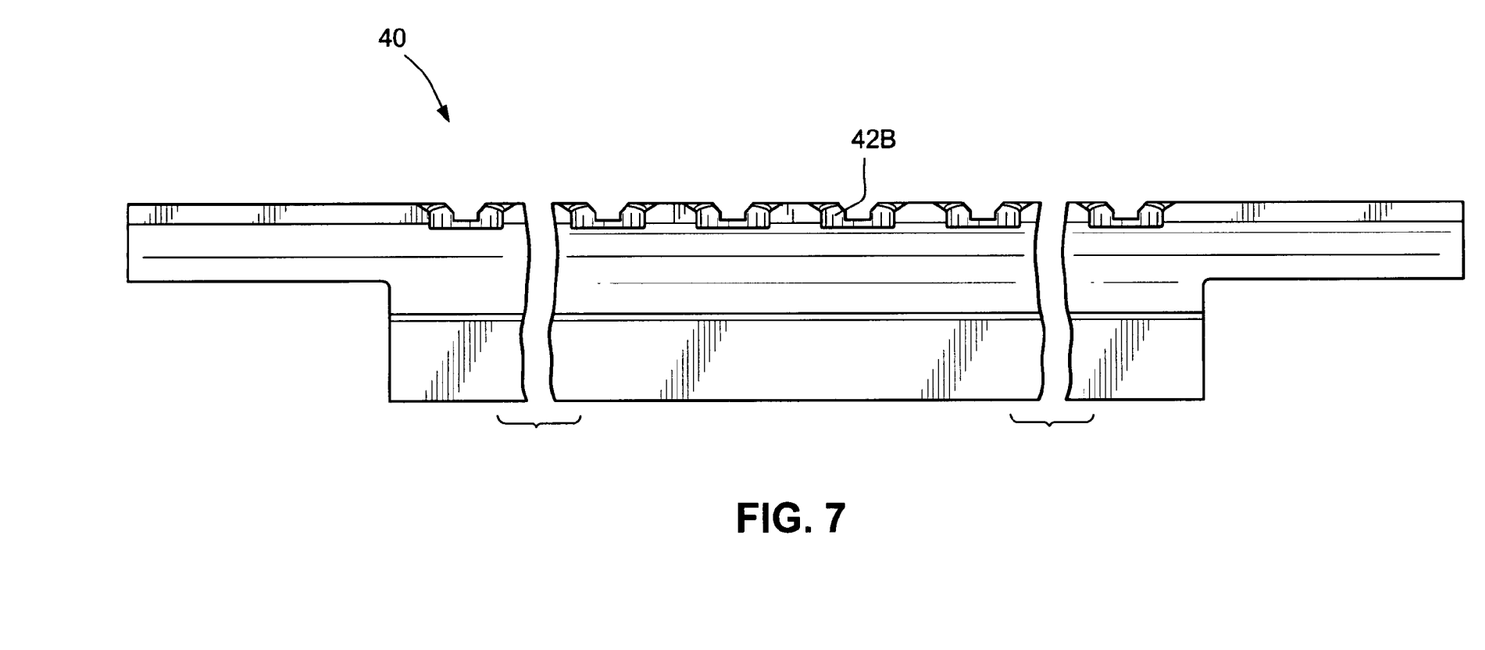
FIG. 7 is a front view of the carrier bar of FIG. 3.

As best shown in FIGS. 2A, 2B, and 2C each tablet 2 includes an elongated main body with a first side 4, a second side 6 opposite the first side, and a side wall 8 that interconnects the first and second sides. A recessed portion 7 is provided in each side. The rim 9 surrounding each recessed portion may have a convex configuration. In an alternative embodiment, the tablet may not include a recessed portion.

As shown in FIG. 1, the conveyer apparatus 10 includes a conveyer 14 providing the plurality of carrier bars, a feed hopper 16, one or more processing stations 18, 20 (e.g., marking apparatus, inspection unit), and a discharge bin 22 where tablets are collected. Also, a discharge device 24 according to an embodiment of the invention is provide upstream of the discharge bin.

FIGS. 3-7 show a carrier bar 40 according to an embodiment of the present invention. As illustrated, each carrier bar 40 is provided with one or more opposing pairs of pocket halves 42A, 42B disposed along the length of the carrier bar. Each pair of pocket halves includes a first pocket half 42A provided along one edge of the carrier bar and a second pocket half 42B provided along the opposite edge of the carrier bar. In an embodiment, each edge of the carrier bar may include 1-30 pockets (e.g., 5-25 pockets, 20-25 pockets, 22 pockets). In the illustrated embodiment, the longitudinal axis of each pocket is aligned with the direction of travel of the carrier bar. In an embodiment, as shown in FIG. 11, the length d7 of each pocket half is about 0.4-0.5 inches, e.g., 0.42 inches, however, it is to be understood that these dimensions and ranges are merely exemplary and other dimensions and ranges are possible, e.g., depending on article, etc.

Figures 8, 9:
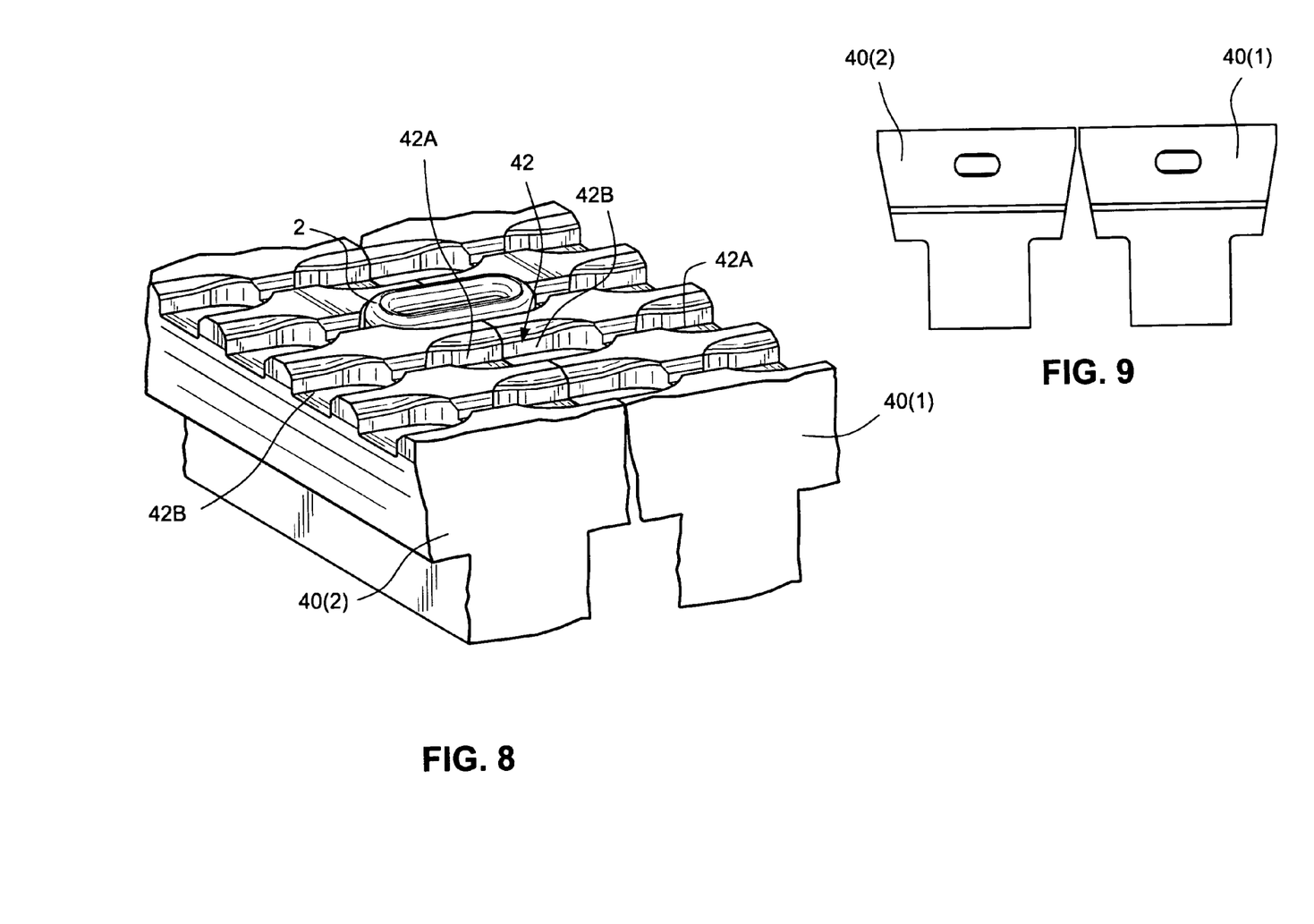
FIG. 8 is a perspective view showing adjacent carrier bars according to an embodiment of the present invention, the carrier bars in a "closed" position.
FIG. 9 is a side view of the carrier bars of FIG. 8.
Figure 10:
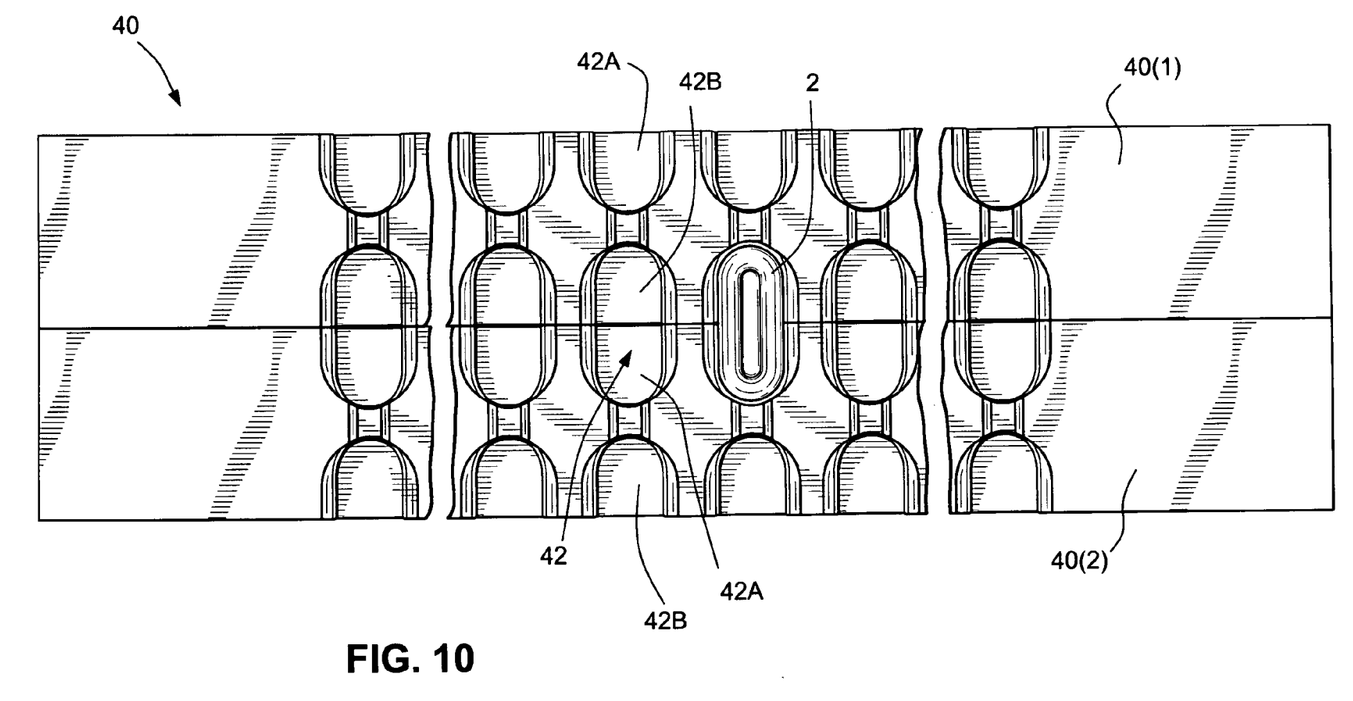
FIG. 10 is a top view of the carrier bars of FIG. 8.

In use, as shown in FIGS. 8-10, each pocket half cooperates with a pocket half of an adjacent carrier bar to form a tablet receiving pocket 42. For example, pocket half 42B of carrier bar 40(1) may cooperate with pocket half 42A of adjacent carrier bar 40(2) to define pocket 42.

Figure 14:
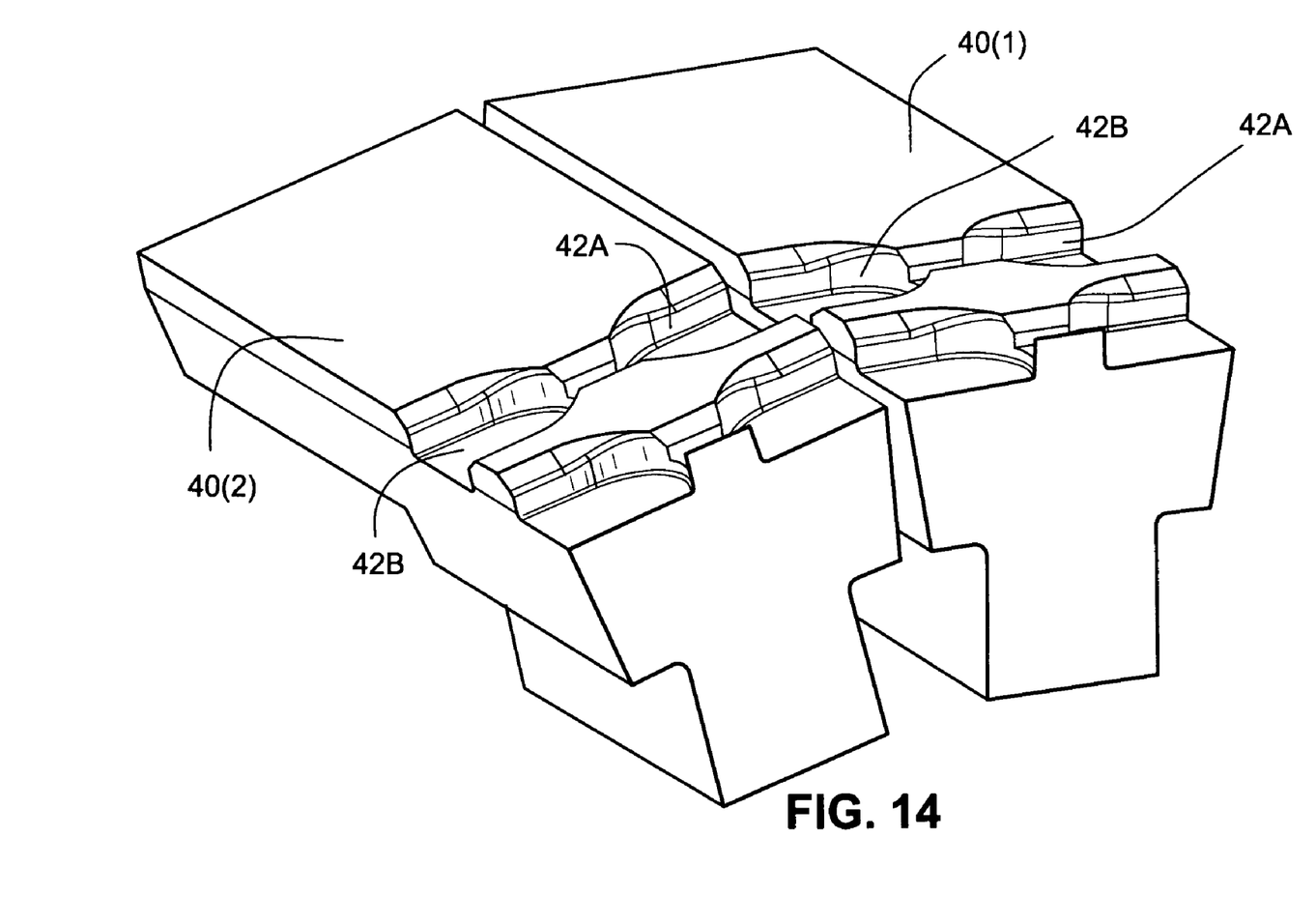
FIG. 14 is a perspective view showing adjacent carrier bars according to an embodiment of the present invention, the carrier bars in an "open" position.

The feed hopper 16 is structured to receive a supply of tablets and deliver the tablets onto the conveyer. As the conveyer is drawn beneath the feed hopper, the carrier bars will become filled with tablets. Specifically, the conveyer path includes a non-linear or curved portion adjacent the feed hopper such that adjacent carrier bars 40(1), 40(2) open up in clam shell-like manner (e.g., see FIG. 14) to allow or facilitate insertion of the tablets into a respective pocket 42 formed by pocket halves 42A, 42B. As the conveyer moves downstream from the feed hopper, the conveyer provides a linear path or portion which causes adjacent carrier bars to close in clam shell-like manner such that the tablets may be positioned within respective pockets, e.g., see FIGS. 8-10. In an embodiment, the tablets may be clamped or fixed in a predetermined lateral, longitudinal, and rotational position while being conveyed such that one or more processes may be performed on the tablets while it is maintained in the predetermined position, e.g., serial processing operations by processing stations 18, 20, e.g., multi-color printing or multiple processing stations arranged along the length of the conveyer path.

Figure 11:
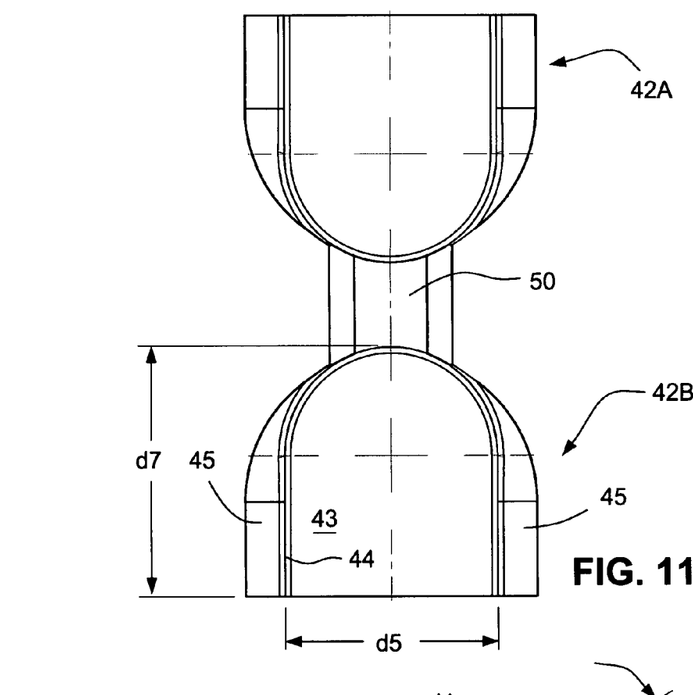
FIG. 11 is a top view of pocket halves for a carrier bar according to an embodiment of the present invention.
Figure 12:
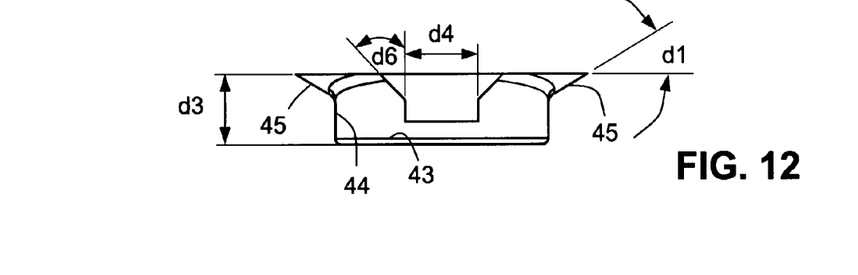
FIG. 12 is a front view of the pocket halves of FIG. 11.
Figure 13:
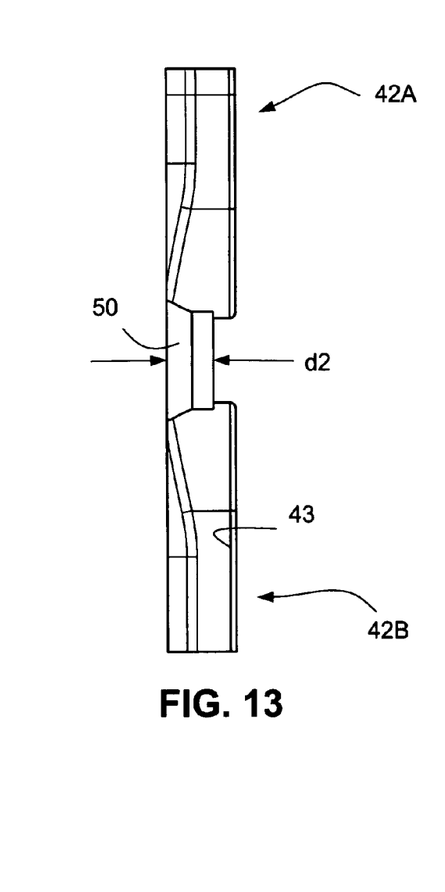
FIG. 13 is a side view of the pocket halves of FIG. 11.

As best shown in FIGS. 11-13, each pocket half 42A, 42B includes a generally flat bottom wall 43 and side walls 44 that are suitably shaped or contoured to substantially conform to the exterior shape of the tablet. The depth of the pocket may allow one side of the tablet to extend from the upper exterior surface of the carrier bar, i.e., one side of the tablet is sufficiently exposed for processing operations.

The pocket holds the tablet in a horizontal position, and the peripheral surface of the side wall surrounds the tablet (e.g., surrounds the side wall of the tablet) to help maintain the tablet in such position in a stable manner, e.g., prevent movement during processing. A small clearance may be provided between the tablet and peripheral surface to facilitate entry/exit of the tablet into the pocket.

In the illustrated embodiment, edges 45 of the pocket adjacent the upper surface of the carrier bar may be chamfered or tapered to facilitate entry of the tablet into the pocket. As shown in FIG. 12, the ramp angle dl may be about 15-45°, e.g., 30°.

Figure 16:
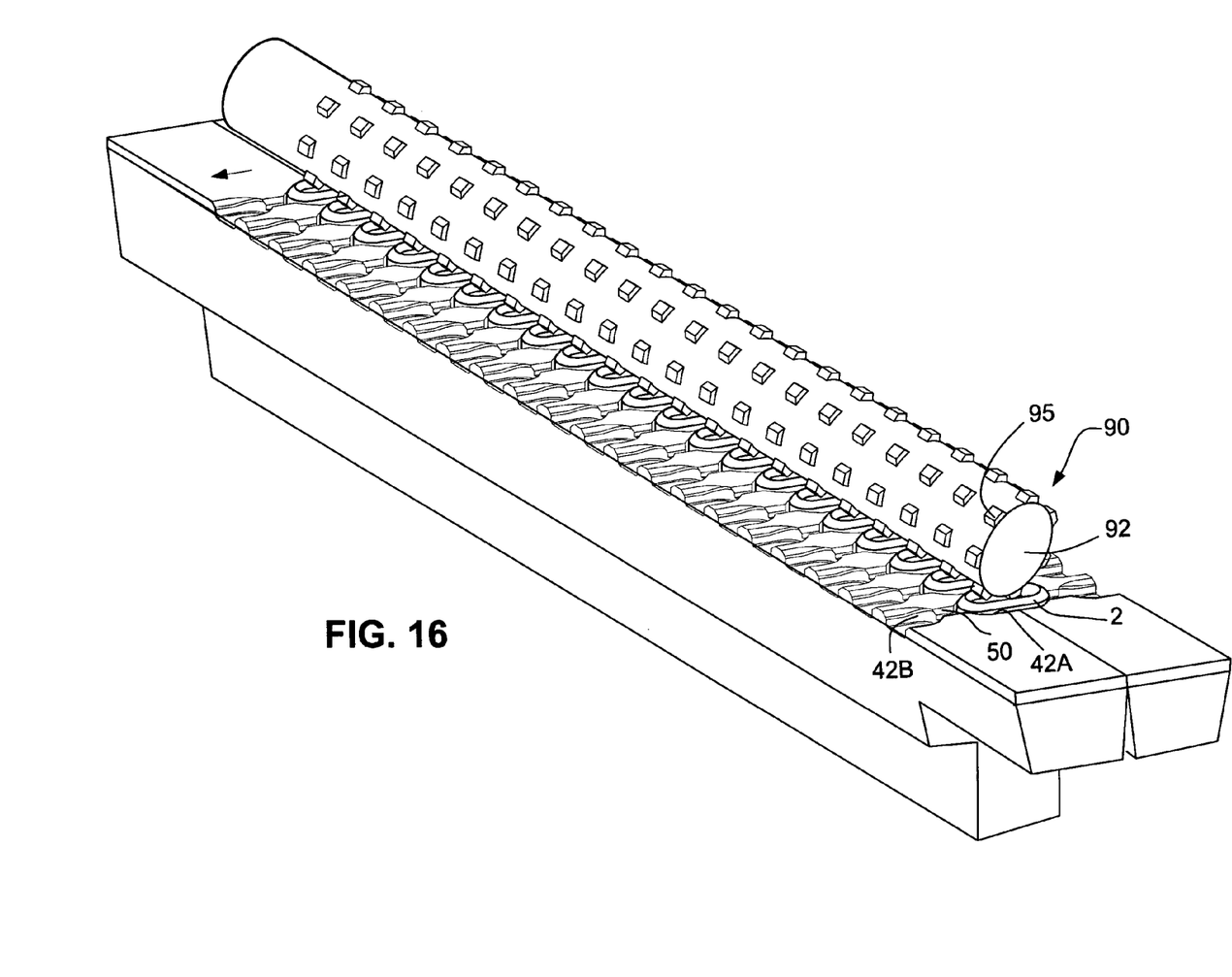
FIG. 16 is a perspective view showing interaction of carrier bars and a marking apparatus according to an embodiment of the invention.

In addition, a connecting groove 50 is provided in the upper surface of the carrier bar and extends between opposed pocket halves 42A, 42B. As shown in FIG. 16, the connecting groove 50 is provided to accommodate an applicator 95 (e.g., protuberance or finger) of a marking apparatus 90, e.g., rubber roller. That is, the marking apparatus includes a rotating printing roll 92 with a plurality of protruding applicators 95 structured to apply indicia to the tablets 2 (i.e., indicia applied within the grooved portion of each tablet) as the carrier bars travel past the printing roll. The printing roll may be in contact with an ink roll which is in contact with both the printing roll and an ink pan. In use, the connecting groove 50 accommodates a protruding applicator 95 as the carrier bar travels past the printing roll 92.

In the illustrated embodiment, the connecting groove 50 includes a depth d2 (e.g., about 0.05-0.1 inches, e.g., 0.08 inches) that is less than a depth d3 of each pocket (e.g., about 0.1-0.15 inches, e.g., 0.118 inches), e.g., see FIGS. 12 and 13. In addition, a width d4 of the groove 50 (e.g., about 0.125 inches) is less than a width d5 of the pocket half (e.g., about 0.365 mm), e.g., see FIGS. 11 and 12. Also, edges of the connecting groove adjacent the upper surface of the carrier bar may be chamfered or tapered. The ramp angle d6 may be about 30-60°, e.g., 45°. It is to be understood that these dimensions and ranges are merely exemplary and other dimensions and ranges are possible, e.g., depending on article, marking apparatus, etc.

Figure 15A:
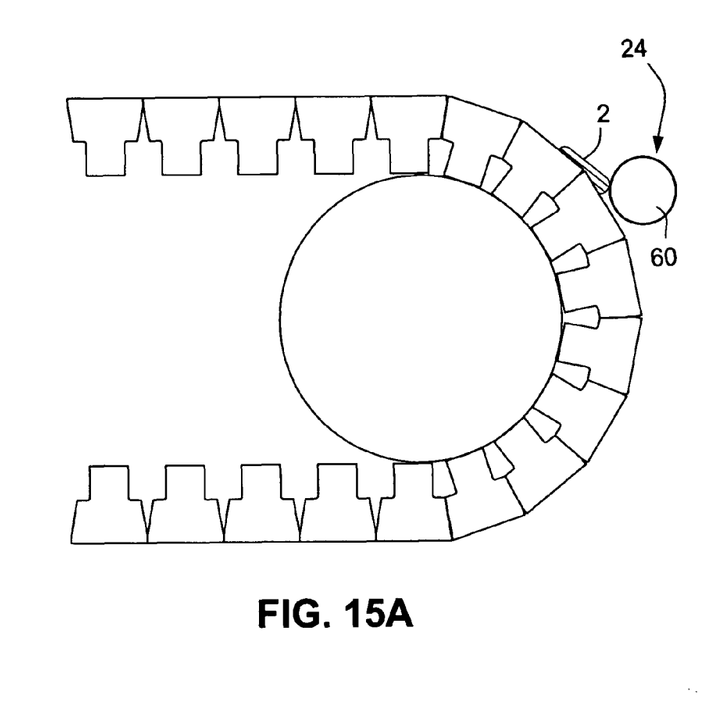
FIGS. 15A and 15B are schematic views of a discharge device according to an embodiment of the present invention.
Figure 15B:
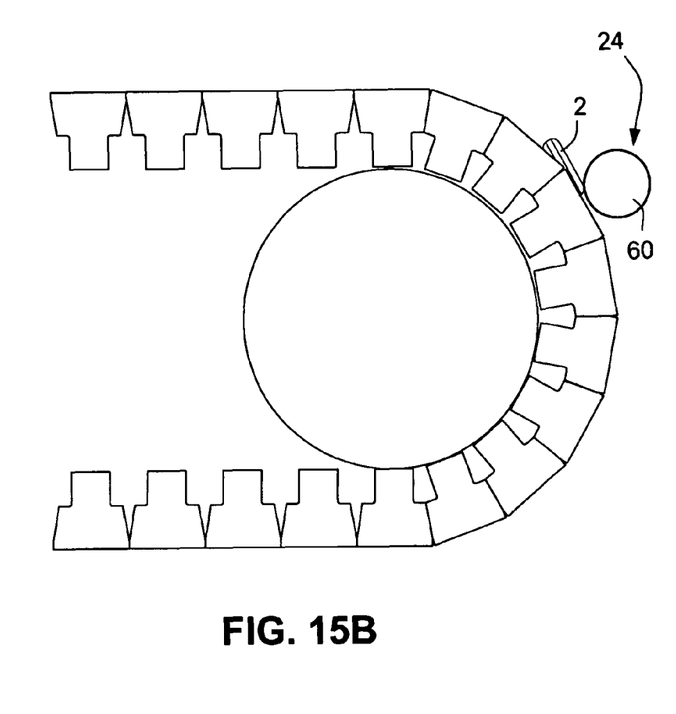
Figures 15C, 15D, 15E:
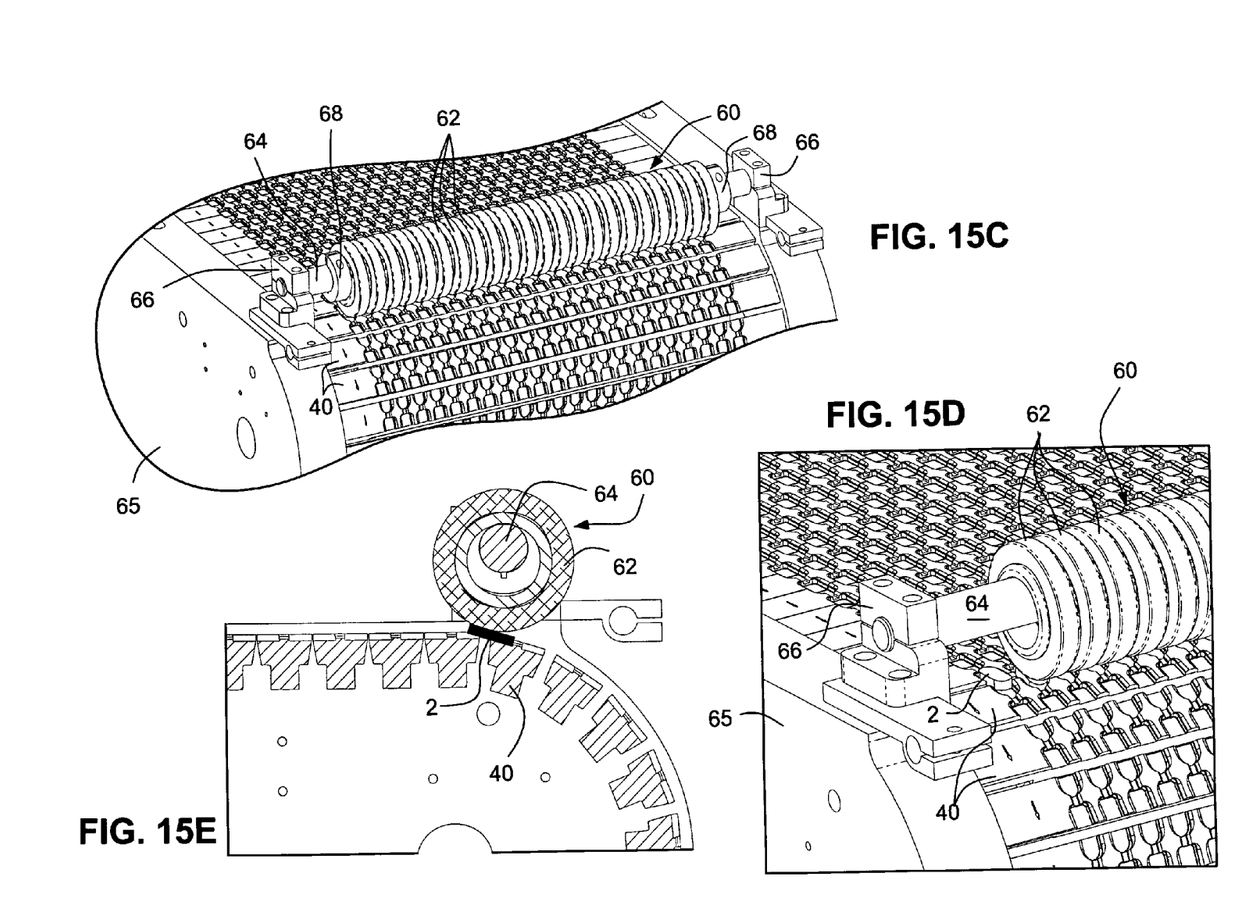
FIG. 15C is a perspective view of a discharge device according to an embodiment of the present invention.
FIG. 15D is an enlarged perspective view of the discharge device of FIG. 15C.
FIG. 15E is a cross-sectional view of the discharge device of FIG. 15C.
Figure 17:
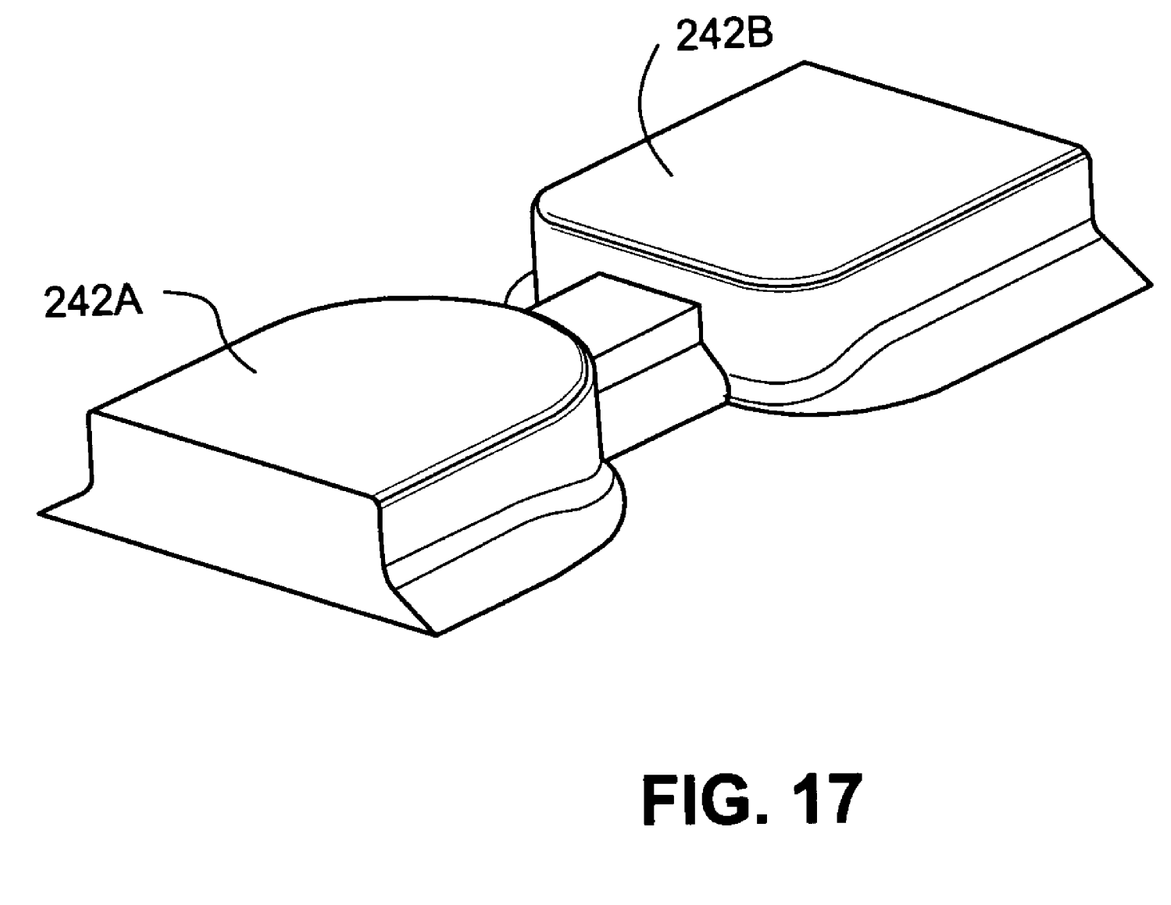
FIG. 17 is a perspective view of pocket halves according to another embodiment of the invention.

In the illustrated embodiment of FIGS. 11-13, the pocket halves 42A, 42B include the same configuration or shape. In an alternative embodiment, the opposing pocket halves of each carrier may include different shapes. In such embodiment, the leading and trailing halves of the tablet receiving pocket in use will have different shapes. For example, as shown in FIG. 17, the pocket half 242A includes a different shape than pocket half 242B, e.g., pocket half 242A includes a more rounded end than that of pocket half 242B which has a more squared off end. FIGS. 15C and 15D show carrier bars of such configuration in use, with the leading half of each pocket including the more rounded end and the trailing half of each pocket including the more squared off end.

The discharge device 24 is provided along a non-linear or curved portion of the conveyer path adjacent the discharge bin. As the carrier bars reach such non-linear or curved portion, adjacent carrier bars 40(1), 40(2) open up in clam shell-like manner to allow removal of the articles from the pockets by gravity. As shown in FIGS. 15A and 15B, the discharge device 24 may include a roller 60 provided along such non-linear or curved portion to facilitate dislodgement of the tablets from leading and/or trailing edges of respective pockets. The roller 60 is positioned with respect to the carrier bars to contact and ensure dislodgement of the tablets from the carrier bar. Thus, the discharge device ensures that any tacky or sticky tablets that are stuck or adhered to the pocket are dislodged to allow for proper discharge into the discharge bin 22. FIG. 15A shows the roller 60 facilitating dislodgement of a tablet 2 inadvertently adhered to a trailing edge or trailing half of the pocket, and FIG. 15B shows the roller facilitating dislodgement of a tablet inadvertently adhered to a leading edge or leading half of the pocket. It should be appreciated that the discharge device may include other suitable structures to facilitate dislodgement, e.g., bar, discharge fingers, etc. Also, the discharge device may cooperate with the connecting grooves between pocket halves of the carrier bars.

FIGS. 15C to 15D show alternative views of the discharge device according to an embodiment of the invention. As illustrated, the roller 60 includes one or more ring-shaped roller members 62 supported by a bar 64. The bar 64 is supported on the conveyer frame 65 by support members 66. The roller members may be axially retained in position on the bar 64 by retaining members 68. In use, the roller members 62 contact the tablets 2 to ensure removal from respective pockets. The roller members 62 may move radially with respect to the bar to allow the tablets to pass between the roller members and the carrier bars. The discharge device may be dimensioned to contact all articles or only those which protrude as a result of being adhered to the carrier bar pockets.

The conveyer may be in the form of a continuous chain conveyer disposed upon appropriately positioned sprockets. A motor unit is provided to operate the chain conveyer in a predetermined direction. The chain conveyer is constructed and arranged to mount, e.g., and releasably mount, the carrier bars. For example, each lateral side of the carrier bar may be provided with a respective pin hole adapted to receive respective mounting pins, e.g. of a quick-release system. Further details of such quick-release system are provided in U.S. Pat. No. 5,630,499, which is incorporated herein by reference in its entirety.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A conveyer apparatus for transporting and processing pellet-shaped articles, the conveyer apparatus comprising:
    a conveyer including a plurality of carrier bars to convey a plurality of articles along a predetermined conveyer path, each carrier bar having a pocket half that cooperates with a pocket half of an adjacent carrier bar to form an article receiving pocket to receive and transport an article along the predetermined conveyer path; and
    a discharge device positioned at a point where pocket halves of adjacent carrier bars open relative to one another to dislodge one or more of the articles from the carrier bars.

2. A conveyer apparatus according to claim 1, wherein the discharge device is provided along a non-linear or curved portion of the conveyer path.

3. A conveyer apparatus according to claim 1, wherein the discharge device includes a roller.

4. A conveyer apparatus according to claim 3, wherein the discharge device includes multiple ring-shaped roller members supported by a bar.

5. A conveyer apparatus according to claim 4, wherein the roller members are movable radially with respect to the bar to allow the tablets to pass between the roller members and the carrier bars.

6. A conveyer apparatus according to claim 1, wherein each carrier bar includes one or more opposing pairs of pocket halves.

7. A conveyer apparatus according to claim 6, wherein each carrier bar includes a connecting groove that extends between opposing pocket halves.

8. A conveyer apparatus according to claim 7, wherein the connecting groove includes a depth that is less than a depth of the pocket halves.

9. A conveyer apparatus according to claim 7, wherein the connecting groove includes a width that is less than a width of the pocket halves.

10. A conveyer apparatus according to claim 7, wherein edges of the connecting groove adjacent an upper surface of the carrier bar are chamfered or tapered.

11. A conveyer apparatus according to claim 1, wherein edges of the pocket half adjacent an upper surface of the carrier bar are chamfered or tapered.

12. A conveyer apparatus according to claim 1, wherein the discharge device is structured to only contact and dislodge an article which protrudes as a result of being adhered to the pocket of the carrier bars.

13. A conveyer apparatus according to claim 1, wherein the discharge device is positioned with respect to the carrier bars to ensure that all articles from the carrier bars are discharged into an outlet.

14. A conveyer apparatus according to claim 1, wherein adjacent carrier bars are structured to open up in a clam shell-like manner to allow removal of the article from the pocket halves of the adjacent carrier bars by gravity, and the discharge device is positioned with respect to the carrier bars to ensure removal of the article even if adhered or stuck to one of the pocket halves at the point where the pocket halves open up.

15. A conveyer apparatus according to claim 14, wherein the discharge device is structured to contact all articles.

16. A conveyer apparatus according to claim 14, wherein the discharge device is structured to only contact articles which protrude as a result of being adhered or stuck to the pocket of the carrier bars.

17. A conveyer apparatus according to claim 1, wherein one of the pocket halves provides a leading edge of the pocket and the other of the pocket halves provides a trailing edge of the pocket, and the discharge device is positioned to facilitate dislodgement of the article inadvertently adhered or stuck to the leading edge or the trailing edge.

18. A conveyer apparatus according to claim 1, wherein the discharge device is provided along a non-linear or curved portion of the conveyer path where the pocket halves of adjacent carrier bars open relative to one another.

19. A conveyer apparatus according to claim 18, wherein the point where the pocket halves of adjacent carrier bars open relative to one another is the point at which the discharge device is structured to contact and dislodge an article which protrudes as a result of being adhered to the pocket of the carrier bars.

20. A method for transporting and processing pellet-shaped articles, the method comprising:
    conveying a plurality of articles along a predetermined conveyer path within carrier bars each having a pocket half that cooperates with a pocket half of an adjacent carrier bar to form an article receiving pocket to receive and transport an article along the conveyer path; and
    dislodging any articles that are stuck to one of the pocket halves at a point pocket halves of adjacent carrier bars open relative to one another.

* * * * *